(12) United States Patent
Colson et al.

(10) Patent No.: US 8,672,768 B2
(45) Date of Patent: Mar. 18, 2014

(54) AIR BEARING SHAFT FOR RAM AIR FAN

(75) Inventors: Darryl A. Colson, West Suffield, CT (US); Robert Telakowski, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/444,355

(22) Filed: Apr. 11, 2012

(65) Prior Publication Data

US 2013/0274022 A1 Oct. 17, 2013

(51) Int. Cl.
*F16C 3/00* (2006.01)

(52) U.S. Cl.
USPC ........................................ 464/183; 123/41.65

(58) Field of Classification Search
USPC ........ 464/17, 183; 415/180; 123/41.63–41.66
See application file for complete search history.

(56) References Cited

U.S. PATENT DOCUMENTS

| | | | | |
|---|---|---|---|---|
| 1,953,540 A | * | 4/1934 | Ogden | 415/180 X |
| 2,215,945 A | * | 9/1940 | Vincent | 415/180 X |
| 2,371,872 A | * | 3/1945 | Martin et al. | 123/41.65 X |
| 5,564,903 A | * | 10/1996 | Eccles et al. | |
| 6,681,592 B1 | | 1/2004 | Lents et al. | |
| 7,342,332 B2 | | 3/2008 | McAuliffe et al. | |
| 7,394,175 B2 | | 7/2008 | McAuliffe et al. | |
| 7,419,357 B2 | | 9/2008 | Nohr et al. | |
| 7,648,279 B2 | | 1/2010 | Struziak et al. | |
| 7,732,953 B2 | | 6/2010 | Telakowski | |
| 7,748,208 B2 | | 7/2010 | Jewess et al. | |
| 7,757,502 B2 | * | 7/2010 | Merritt et al. | |
| 2006/0061222 A1 | | 3/2006 | McAuliffe et al. | |
| 2012/0014784 A1 | | 1/2012 | Hipsky et al. | |

OTHER PUBLICATIONS

McNichols Tube Dimension Table [online] retrieved Aug. 15, 2013 at http://mcnichols.com.*
Oxford Dictionary, Definiton for "ram air," Oxford University Press, 2013 [online], [retrieved on Oct. 18, 2013]. Retrieved from the Internet <URL:www.oxforddictionaries.com.>.*

* cited by examiner

*Primary Examiner* — Gregory Binda
(74) *Attorney, Agent, or Firm* — Cantor Colburn LLP

(57) ABSTRACT

An air bearing for a ram air fan includes a shaft having a first end portion that defines a cap end, a second end portion that defines a thrust shaft receiving end, and an intermediate portion extending between the first and second end portions. The cap end includes a cap pilot bore and the thrust shaft receiving end includes a thrust shaft pilot section. The thrust shaft pilot section has an outer diameter of between about 1.6032-inches (about 40.7212 mm) and about 1.6002-inches (about 40.6450 mm).

14 Claims, 2 Drawing Sheets

AIR BEARING SHAFT FOR RAM AIR FAN

BACKGROUND OF THE INVENTION

Exemplary embodiments pertain to the art of air bearings and, more particularly, to an air bearing shaft for a ram air fan.

Ram air fans operate when ram airflow may not be sufficient to provide adequate airflow over air-to-air heat exchangers. In many cases, ram air fans are employed in environmental control systems employed in aircraft. Conventional ram air systems include fan rotor arranged downstream of the air-to-air heat exchanger. The second fan rotor is supported by air bearings. Air bearings include an internal flow path through which passes a cooling fluid. The cooling fluid passes in a heat exchange relationship with the air bearing to absorb and dissipate heat.

BRIEF DESCRIPTION OF THE INVENTION

Disclosed is an air bearing for a ram air fan including a shaft having a first end portion that defines a cap end, a second end portion that defines a thrust shaft receiving end, and an intermediate portion extending between the first and second end portions. The cap end includes a cap pilot bore and the thrust shaft receiving end includes a thrust shaft pilot section. The thrust shaft pilot section has an outer diameter of between about 1.6032-inches (about 40.7212 mm) and about 1.6002-inches (about 40.6450 mm).

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
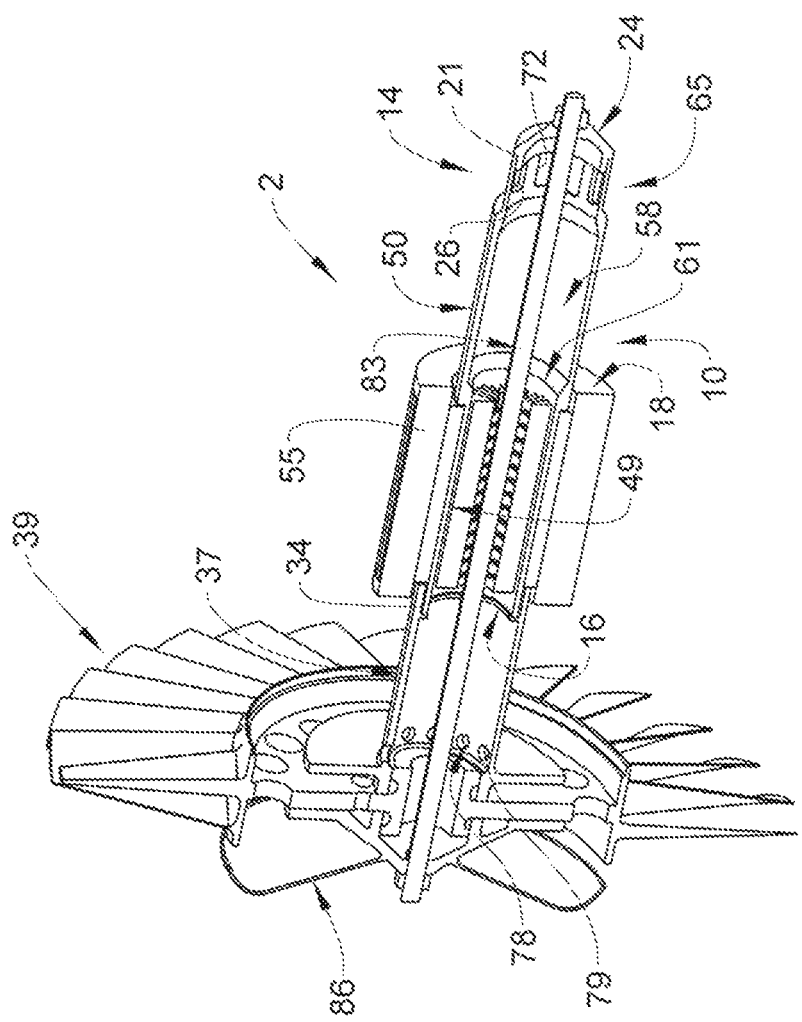
FIG. 1 is a partially cut-away perspective view of an air bearing for a ram air fan in accordance with an exemplary embodiment.
Figure 2:
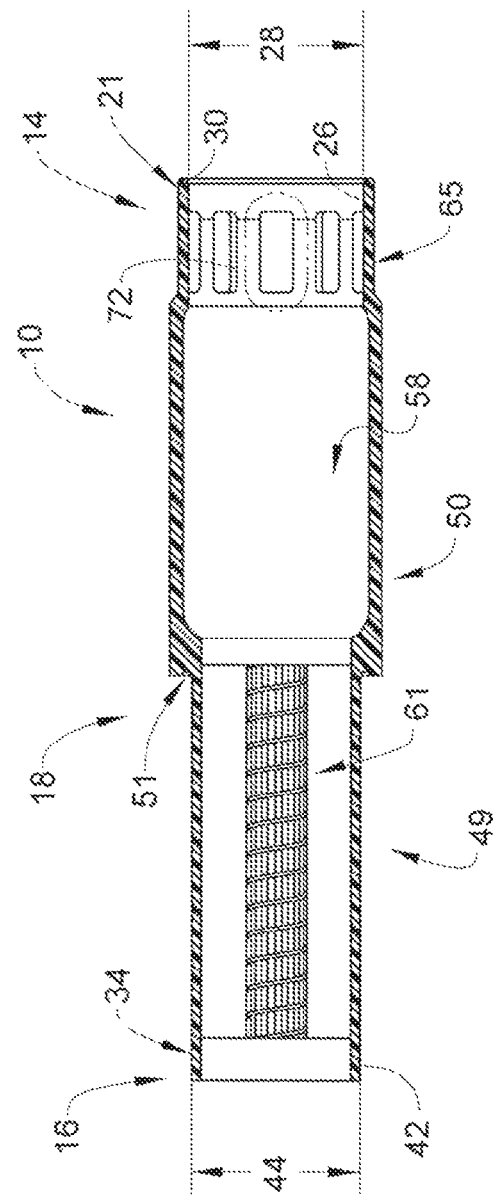
FIG. 2 is a cross-sectional view of the air bearing of FIG. 1.

An air bearing for a ram air fan in accordance with an exemplary embodiment is indicated generally at 2 in FIGS. 1 and 2. Air bearing 2 includes a shaft 10 having a first end portion 14 that extends to a second end portion 16 through an intermediate portion 18. First end portion 14 defines a cap end 21 that supports a shaft cap 24. Cap end 21 includes a shaft cap pilot 26 having an inner diameter 28 provided with a chamfer 30 that facilitates the insertion of shaft cap 24. Chamfer 30 has an angle of about 30° relative to a centerline (not separately labeled) of shaft 10. As will be detailed more fully below, inner diameter 28 is sized so as to provide an interference fit with shaft cap 24 over a wide range of operating conditions and temperatures.

Second end portion 16 defines a thrust shaft receiving end 34 that supports a thrust shaft 37. Thrust shaft 37 supports a fan member 39 that generates an air flow when air bearing 2 is rotated. In accordance with the exemplary embodiment, thrust shaft receiving end 34 includes a thrust shaft pilot section 42 having an outer diameter 44. As will also be detailed more fully below, outer diameter 44 is sized so as to provide an interference fit with thrust shaft 37 over a wide range of operating conditions and temperatures.

Intermediate portion 18 includes a motor section 49 and a cooling fluid inlet section 50 that are separated by a stepped section 51. With this arrangement, motor section 49 supports a rotor 55. Rotor 55 revolves in response to a magnetic field induced, at least in part, by a stator (not shown). Intermediate portion 18 is further shown to include a central passage 58 that extends from first end portion 14 to second end portion 16. A finned heat exchanger 61 is arranged within central passage 58 at motor portion 49. Finned heat exchanger 61 removes heat inside central passage 58 generated by operation of rotor 55.

Figure 3:
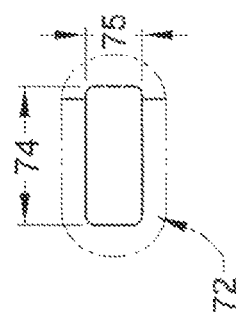
FIG. 3 is a plan view of a cooling slot of the air bearing of FIG. 2.

Cooling fluid inlet 65 includes a plurality of cooling fluid inlet slots, one of which is shown at 72, which are arrayed about cooling fluid inlet portion 50. As best shown in FIG. 3, cooling fluid inlet slots 72 include an axial dimension 74 and a circumferential dimension 75. Fan member 39 draws in cooling fluid, such as air, which enters through cooling fluid inlet slots 72. The cooling fluid flows along central passage 58 into thrust shaft 37 before passing from a cooling fluid outlet 78 having a plurality of openings 79. Shaft 10 is also shown to include a tie rod 83 that extends through central passage 58. Tie rod 83 is supported at one end (not separately labeled) by shaft cap 24 and at a second end (also not separately labeled) by a fan shroud 86. Tie rod 83 passes through central passage 58 and finned heat exchanger 61, thrust shaft 37 and fan member 39 before terminating at fan shroud 86. Fan shroud 86 directs flow into fan member 39. Tie rod 83 is pre-loaded with an amount of tension that ensures that revolving components of motor section 49 are held together and act as a single rotating component.

In accordance with an exemplary embodiment, inner diameter 28 has a dimension of between about 1.5655-inches (about 39.7637 mm) and about 1.5645-inches (about 39.7383 mm). In accordance with another aspect of the exemplary embodiment, inner diameter 28 includes a dimension of between about 1.56525-inches (about 39.75735 mm) and about 1.56475-inches (about 39.74465 mm). In accordance with still another aspect of the exemplary embodiment, inner diameter 28 includes a dimension of about 1.5650-inches (about 39.9751 mm). As noted above, the particular dimension of inner diameter 28 provides an interference fit with shaft cap 24 over a wide range of operating conditions and temperatures.

In further accordance with an aspect of an exemplary embodiment, outer diameter 44 includes a dimension of between about 1.6032-inches (about 40.7212 mm) and about 1.6002-inches (about 40.6450 mm). In accordance with another aspect of the exemplary embodiment, outer diameter 44 includes a dimension of between about 1.60295-inches (about 40.71493 mm) and about 1.60245-inches (about 40.70223 mm). In accordance with yet another aspect of the exemplary embodiment, outer diameter 44 includes a dimension of about 1.6027-inches (about 40.7085 mm). As also discussed above, the particular dimension of outer diameter 44 provides an interference fit with thrust shaft 37 over a wide range of operating conditions and temperatures.

In accordance with still another aspect of an exemplary embodiment, axial dimension 74 is between about 0.77-inches (about 19.558 mm) and about 0.75-inches (about 19.0500 mm), and a circumferential dimension 75 is between about 0.28-inches (about 7.112 mm) and about 0.26-inches (about 6.604 mm). In accordance with another aspect of the exemplary embodiment, axial dimension 74 is between about 0.765-inches (about 19.431mm) and about 0.755-inches (about 19.177 mm), and a circumferential dimension 75 is between about 0.275-inches (about 6.985 mm) and about 0.271-inches (about 6.883 mm). In accordance with another aspect of the exemplary embodiment, axial dimension 74 is about 0.76-inches (about 19.30 mm) and circumferential dimension 75 is about 0.270-inches (about 6.86 mm). The particular size of axial dimension 74 and circumferential dimension 75 provides an opening that allows for a desirable intake of cooling fluid.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An air bearing for a ram air fan comprising:
an air bearing shaft having a first end portion that defines a cap end that extends to a second end portion that defines a thrust shaft receiving end, and an intermediate portion extending between the first and second end portions, the cap end including a cap pilot bore and the thrust shaft receiving end including a thrust shaft pilot section, the thrust shaft pilot section having an outer diameter of between about 1.6032-inches and about 1.6002-inches.

2. The air bearing according to claim 1, wherein the outer diameter of the thrust shaft pilot section is between about 1.60295-inches and about 1.60245-inches.

3. The air bearing according to claim 2, wherein the outer diameter of the thrust shaft pilot is about 1.6027-inches.

4. The air bearing according to claim 1, wherein the cap pilot bore includes an internal diameter of between about 1.5655-inches and about 1.5645-inches.

5. The air bearing according to claim 4, wherein the cap pilot bore includes an inner diameter of between about 1.56525-inches and about 1.56475-inches.

6. The air bearing according to claim 5, wherein the cap pilot bore includes an inner diameter of about 1.5650-inches.

7. The air bearing according to claim 4, wherein the cap pilot bore includes a chamfer on the inner diameter, the chamfer having an angle of about 30°.

8. The air bearing according to claim 1, further comprising a cooling fluid inlet having a plurality of cooling fluid inlet slots.

9. The air bearing according to claim 8, wherein each of the plurality of cooling fluid inlet slots includes an axial dimension of between about 0.77-inches and about 0.75-inches, and a circumferential dimension of between about 0.28-inches and about 0.26-inches.

10. The air bearing according to claim 9, wherein each of the plurality of cooling fluid inlet slots includes an axial dimension of between about 0.765-inches and about 0.755-inches, and a circumferential dimension of between about 0.275-inches and about 0.271-inches.

11. The air bearing according to claim 10, wherein each of the plurality of cooling slots includes an axial dimension of about 0.76-inches and a circumferential dimension of about 0.270-inches.

12. The air bearing according to claim 1, wherein the shaft includes a central passage extending from the first end portion to the second end portion, a finned heat exchanger is arranged in and extends along a portion of the central passage.

13. The air bearing according to claim 12, further comprising: a tie rod extending through the central passage between the first end portion and the second end portion, the tie rod extending through the central passage.

14. The air bearing according to claim 1, further comprising: a cooling fluid inlet portion arranged adjacent the second end portion, the cooling fluid inlet portion including a plurality of cooling fluid inlet slots.

* * * * *